United States Patent
Boskovic

[11] Patent Number: 5,368,468
[45] Date of Patent: Nov. 29, 1994

[54] AIR KNOCKOUT FOR PLASTIC MOLDS

[76] Inventor: Borislav Boskovic, 2102 Bannockburn, Inverness, Ill. 60067

[21] Appl. No.: 74,310

[22] Filed: Jun. 9, 1993

[51] Int. Cl.⁵ .............................................. B29C 45/42
[52] U.S. Cl. .................................. 425/556; 264/335; 425/437; 425/444; 425/DIG. 102
[58] Field of Search ................ 264/334, 335; 425/437, 425/444, 554, 556, DIG. 102

[56] References Cited

U.S. PATENT DOCUMENTS

| | | | |
|---|---|---|---|
| 3,838,960 | 10/1974 | Lovejoy | 425/556 |
| 4,375,948 | 3/1983 | Von Holdt | 425/437 |
| 4,531,703 | 7/1985 | Underwood | 425/556 |
| 4,653,997 | 3/1987 | Sheffield et al. | 425/437 |
| 4,755,128 | 7/1988 | Alexander et al. | 425/437 |
| 4,981,430 | 1/1991 | Zimmerman, Jr. | 425/556 |

FOREIGN PATENT DOCUMENTS 1006373  9/1965  United Kingdom ............... 425/556

*Primary Examiner*—Charles S. Bushey
*Attorney, Agent, or Firm*—Lee, Mann, Smith, McWilliams & Sweeney & Ohlson

[57] ABSTRACT

An air-operated knockout device for plastic molds for assisting ejection of molded plastic parts from a mold. The knockout device has a body in which is installed a knockout pin. The knockout pin is normally retained within the body, but can be axially shifted to an extended position to physically eject a molded part from a mold. The knockout pin also includes an air bypass to assist the knockout pin in the ejection of the molded part.

17 Claims, 1 Drawing Sheet

5,368,468

AIR KNOCKOUT FOR PLASTIC MOLDS

BACKGROUND OF THE INVENTION

This invention relates to plastic mold equipment, and in particular to a knockout for ejecting molded parts from a plastic mold.

In injection molding, molten plastic is injected into a mold comprising two parts, a cavity and a core. The cavity and core join at a parting line, and when a part has been molded, the mold halves are separated at the parting line to allow ejection of the molded part. Typically, ejection is by means of one or more knockout pins formed in the mold and activated as the mold is opened.

One problem with using ejecting pins is the fact that the pins concentrate ejecting force only locally on the molded part where the part is contacted. Thus, uneven pressure is applied to the molded part. In addition, as a part is being separated from the mold half to which it is adhering, often a partial vacuum is created during the separation until air can rush into any gap to relieve the vacuum. The creation of a vacuum is an undesirable aspect of ejection of a molded part.

The present invention overcomes these detriments of the prior art and others. Not only is the creation of a vacuum avoided, but also by utilization of both air and mechanical force, the part is ejected far more easily and with far less opportunity for damage to the freshly-molded part.

SUMMARY OF THE INVENTION

The invention is directed to a knockout device for a plastic mold. The device has a body shaped to be located in an aperture in a mold part, and a central cavity located in the body with an outlet at one end of the body. A knockout pin is provided in the cavity, the pin having a head portion located in the cavity and a stem portion extending from the head portion into the outlet. Means is provided for resiliently retaining the knockout pin in a seated position in the cavity with the stem retracted into the outlet. Means is also provided for shifting the knockout pin to an extended position with the stem portion projecting from the outlet. An air bypass means is provided for producing an air flow from the body proximate the outlet when the knockout is in the extended position.

In accordance with the preferred form of the invention, the central cavity and the outlet are cylindrical, and the outlet is smaller than, and extends axially from, the cavity. The head portion of the knockout pin comprises a piston located within the central cavity, and the air bypass comprises at least one longitudinal groove in the stem portion and one longitudinal groove in the head portion. The outlet has a given length, and the groove in the stem portion is longer than that length so that when the stem is extended, air will bypass the stem portion. The groove in the stem portion does not extend completely to the end so that air cannot bypass the stem portion until it is extended.

For normally retaining the knockout pin within the body, a resilient compression spring is located about the stem portion, bearing between the head portion and a wall of the central cavity. When the knockout pin is activated, the spring is compressed, thus urging the knockout pin to return to its seated position within the body.

Means is provided for maintaining the knockout pin in the cavity. That means comprises a retention ring seated in a groove at an end of the cavity opposite to that where the outlet is located.

The excursion of the knockout pin as it shifts in the body is limited. A shoulder is formed in the cavity in alignment with the head portion so that the stem portion can extend from the body only to the extent that the head portion is permitted to travel within the central cavity before engaging the shoulder.

BRIEF DESCRIPTION OF THE DRAWING

The invention is described in greater detail in the following description of examples embodying the best mode of the invention, taken in conjunction with the drawing figures, in which.

DESCRIPTION OF EXAMPLES EMBODYING THE BEST MODE OF THE INVENTION

Figure 1:
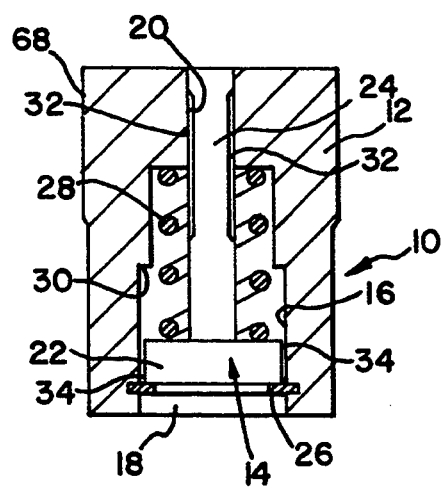
FIG. 1 is an elevational view of an air knockout according to the invention, partially in cross section in order to illustrate internal detail.

An air knockout according to the invention is shown generally at 10 in the drawing figures. The knockout 10 is composed of two basic portions, a body 12 and a knockout pin 14 which is located within a central cavity 16 within the body 12.

As illustrated, the central cavity 16 extends from an inlet 18 to an outlet 20. Preferably, both the cavity 16 and the outlet 20 are cylindrical, and are axially aligned. The knockout pin 14 includes a head portion 22 located within the central cavity 16 and a stem portion 24 extending from the head portion 22 into the outlet 20. The knockout pin 14 is movable axially within the body 12, as is the case with a typical knockout pin.

The knockout pin 14 is retained within the central cavity 16 by means of a retention ring 26. As illustrated, the retention ring 26 is seated in a groove proximate the inlet end 18 of the cavity 16.

The knockout pin 14 is biased to a seated position within the central cavity 16, as illustrated in FIG. 1, by means of a resilient coil spring 28. The coil spring 28 is a typical compression spring, and is located about the stem portion 24, bearing between one side of the head portion 22 and an inner wall of the cavity 16.

Figure 2:
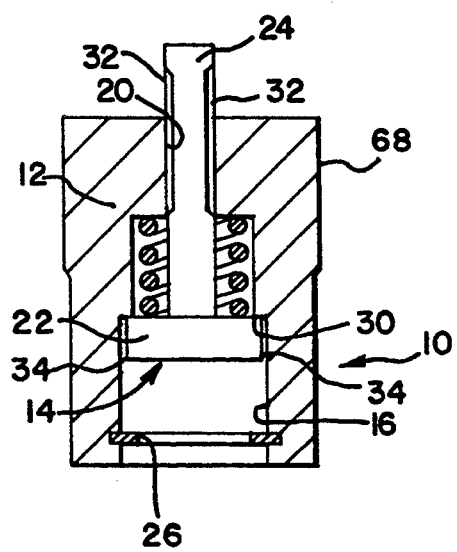
FIG. 2 is a view similar to that in FIG. 1, but showing the air knockout activated and the stem portion extended from the body of the knockout.

When the spring 28 is compressed, as shown in FIG. 2, the stem portion 24 extends from the body 12. However, the excursion of the stem portion 24 is limited by a shoulder 30 formed within the central cavity 26. As shown in FIG. 2, when the head portion 22 bottoms against the shoulder 30, the stem portion 24 protrudes from the body 12 to its full extent.

The knockout pin 14 is typically activated by air pressure on the head portion 14 at the inlet end 18. When air pressure is so-applied, and is sufficient to overcome the compressive force of the spring 28, the stem portion 24 extends from the body portion 12 as illustrated in FIG. 2.

It is an important feature of the invention that not only is the knockout pin 14 able to mechanically aid in the removal of a molded part from a mold, but also air is used in conjunction with the mechanical force of the knockout pin 14. To this end, the stem portion 24 includes one or more longitudinal grooves 32 as illustrated in FIGS. 1 and 2. The grooves are sufficiently long so that when the stem portion 24 is extended as illustrated in FIG. 2, air bypasses the outlet 20. Thus, the length of the grooves 32 is greater than the length of the outlet 20. In addition, in order to communicate air to the grooves 32, one or more longitudinal grooves 34 is also formed in the head portion 22. Thus, a portion of air impinging on the head portion 22 through the inlet 18 is directed into the grooves 34, communicating with the grooves 32 and, when the knockout pin 14 is extended as shown in FIG. 2, bypassing the stem portion 24 to aid in ejection from a mold. While two grooves 32 and two grooves 34 are illustrated in the drawing figures, it will be apparent that one or more of each of the grooves 32 and 34 may be sufficient, depending on the amount of bypass air desired. Also, rather than grooves, the head portion 22 and stem portion 24 can have flattened areas or areas that are otherwise formed to provide a gap between that portion and either the cavity 16 or the outlet 20, as the case may be.

Figure 3:
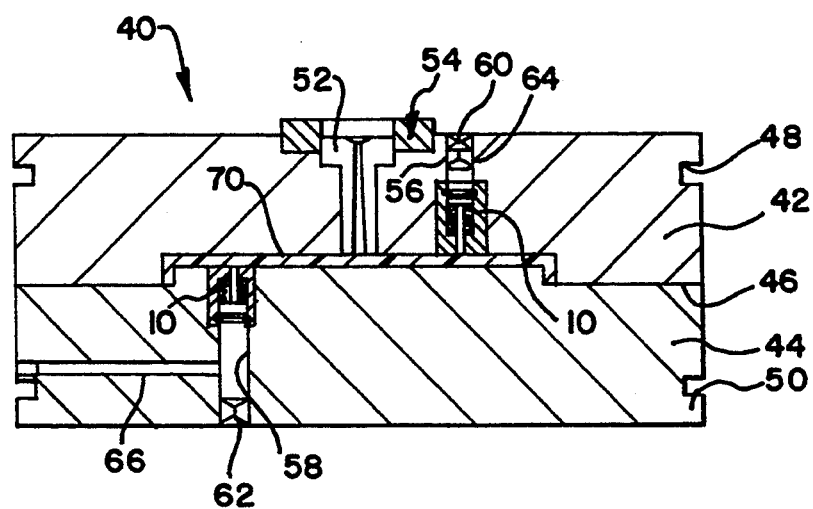
FIG. 3 is a cross-sectional illustration through a typical plastic mold employing air knockout devices according to the invention.

FIG. 3 illustrates a typical schematic cross section of a simple mold 40 employing two of the air knockouts 10 according to the invention. The mold 40, as is conventional, comprises a cavity 42 and a core 44 which meet along a parting line 46. The cavity can be supplied with clamp slots 48 and the core can be supplied with clamp slots 50 for proper holding and activation of the mold parts. For injection of plastic into the mold 10, a sprue bushing 52 is provided, held in place by a locating ring 54 in a conventional manner.

The air knockouts 10 are located in appropriate apertures in the cavity 42 and core 44. A chamber 56 extends from the air knockout 10 located in the cavity 42, and similarly, a chamber 58 extends from the air knockout 10 located in the core 44. The chambers 56 and 58 are used to communicate air pressure to their respective air knockouts 10, and also are provided to permit removal of the air knockouts, which can be accessed from the rear (through a chamber 56 or 58) by a punch or similar device. The chambers 56 and 58 are sealed by respective removable plugs 60 and 62.

Air is communicated to the chamber 56 via an inlet tube 64 from a source of air pressure (not illustrated). Similarly, air is communicated to the chamber 58 via an inlet tube 66 from the same source of air.

The air knockouts 10 are firmly installed in the mold 40 so that air can bypass the knockouts 10 only when the stem portion 24 is extended. Otherwise, the knockouts are sealed. To assure a close fit of the knockouts 10 within their respective apertures in the mold 40, the knockouts 10 may also include enlarged portions 68 to permit a press fit within the mold 40.

In operation, the mold 40 is injected with plastic in a conventional fashion, forming a molded part 70 therein. After the mold has been cooled sufficiently, the cavity 42 and core 44 are separated at the parting line 46. At the same time, air is activated in the inlet tubes 64 and 66, passing into the respective chambers 56 and 58 and impinging on the head portions 22 of the air knockouts 10. Sufficient air pressure extends the knockout pin 14 in each of the knockouts 10, and when the pins 14 have been extended slightly, air is permitted to bypass through the grooves 32 and 34, aiding the mechanical action of the pins 14 in removing the molded part 70 from the mold 40 and also relieving any vacuum which occurs as the molded part 70 begins to separate from the cavity 42 and the core 44.

Although two of the air knockouts 10 are shown conjunction with the mold 40, one in the cavity 42 and one in the core 44, it will be evident that any number of the air knockouts 10 can be employed as necessary, depending on the size and complexity of the mold 40 and the molded part 70. At least one air knockout 10 should be employed on either side of the molded part 70, as illustrated.

The mold 40 is typically formed of metal, and similarly, all parts of the air knockout 10 are also formed of metal in order to withstand the typical temperatures within the mold 40. However, other materials can be used to form the air knockout 10 so long as the materials can withstand the mold temperatures and pressures.

Various changes can be made to the invention without departing from the spirit thereof or scope of the following claims.

What is claimed is:

1. A knockout device for a plastic mold, comprising
   a. a cylindrical body shaped to be located in an aperture in a mold part,
   b. a cylindrical central cavity in said body, said cavity having a cylindrical outlet at one end of said body, said outlet being smaller in diameter than said central cavity,
   c. a knockout pin, said knockout pin having a cylindrical head portion located in said cavity and a cylindrical stem portion extending from said head portion into said outlet, said head portion being larger in diameter than said stem portion,
   d. means resiliently retaining said knockout pin in a seated position in said cavity with said stem retracted into said outlet,
   e. means for shifting said knockout pin to an extended position with said stem portion projecting from said outlet, and
   f. air bypass means for producing an airflow from said body proximate said outlet when said knockout is in said extended position,
   g. said outlet extending axially from said cavity, said head portion comprising a piston located within said central cavity, and said air bypass means comprising at least one longitudinal groove in said stem portion and at least one longitudinal groove in said head portion.

2. A knockout device according to claim 1 in which said outlet has a particular length and said groove has a length greater than said particular length.

3. A knockout device according to claim 2 in which said stem portion has a distal end and said groove is spaced from said end.

4. A knockout device according to claim 1 in which said outlet has a particular length and said groove in said stem portion has a length greater than said particular length.

5. A knockout device according to claim 4 in which said stem portion has a distal end and said groove in said stem portion is spaced from said end.

6. A knockout device according to claim 1 in which said means resiliently retaining comprises a compression spring located about said stem portion and bearing between said head portion and a wall of said cavity.

7. A knockout device according to claim 1 including means maintaining said knockout pin in said cavity.

8. A knockout device according to claim 7 in which said maintaining means comprises a retention ring seated in a groove at one end of said cavity.

9. A knockout device according to claim 1 in which said means for shifting comprises mounting of said head portion for axial movement in said cavity, said body having an aperture in communication with said head portion.

10. A knockout device according to claim 1 including means for limiting shifting of said knockout pin.

11. A knockout device according to claim 10 in which said means for limiting comprises a shoulder formed in said cavity in alignment with said head portion.

12. A knockout device for a plastic mold, comprising
   a. a cylindrical body shaped to be located in an aperture in a mold part,
   b. a cylindrical central cavity in said body, said cavity having a cylindrical outlet at one end of said body, said outlet having a diameter smaller than the diameter of said cavity,
   c. a knockout pin, said knockout pin having a cylindrical head portion located in said cavity and a cylindrical stem portion extending from said head portion into said outlet, said head portion and said stem portion conforming to said cavity and said outlet, respectively, with said head portion being larger in diameter than said stem portion,
   d. means resiliently retaining said knockout pin in a seated position in said cavity with said stem retracted into said outlet,
   e. means for shifting said knockout pin to an extended position with said stem portion projecting from said outlet, and
   f. air bypass means for producing an airflow from said body proximate said outlet when said knockout is in said extended position,
   g. said outlet extending axially from said cavity and said head portion comprising a piston, said air bypass means comprising at least one longitudinal groove in said stem portion and at least one longitudinal groove in said head portion.

13. A knockout device according to claim 12 in which said outlet has a particular length and said groove in said stem portion has a length greater than said particular length.

14. A knockout device according to claim 13 in which said stem portion has a distal end and said groove in said stem portion is spared from said end.

15. A knockout device according to claim 12 in which said means resiliently retaining comprises a compression spring located about said stem portion and bearing between said head portion and a wall of said cavity.

16. A knockout device according to claim 12 in which said means for shifting comprises mounting of said head portion for axial movement in said cavity, said body having an aperture in communication with said head portion.

17. A knockout device according to claim 12 including means for limiting shifting of said knockout pin.

* * * * *